July 19, 1966  T. F. TUMICKI  3,261,164
CONVERGENT-DIVERGENT CO-ANNULAR PRIMARY NOZZLE
Filed Sept. 23, 1964
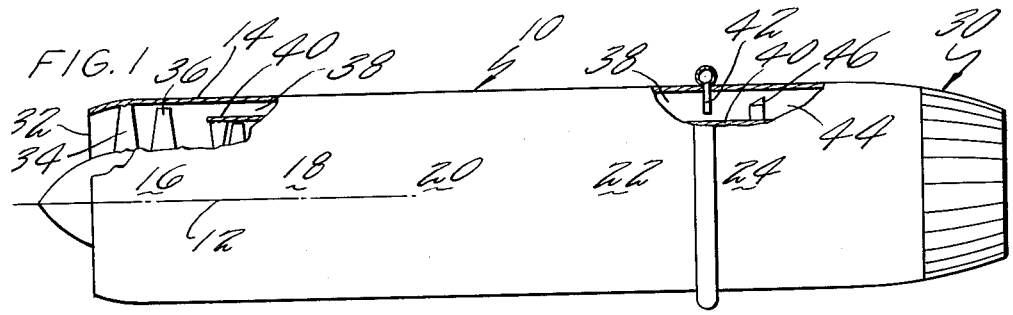
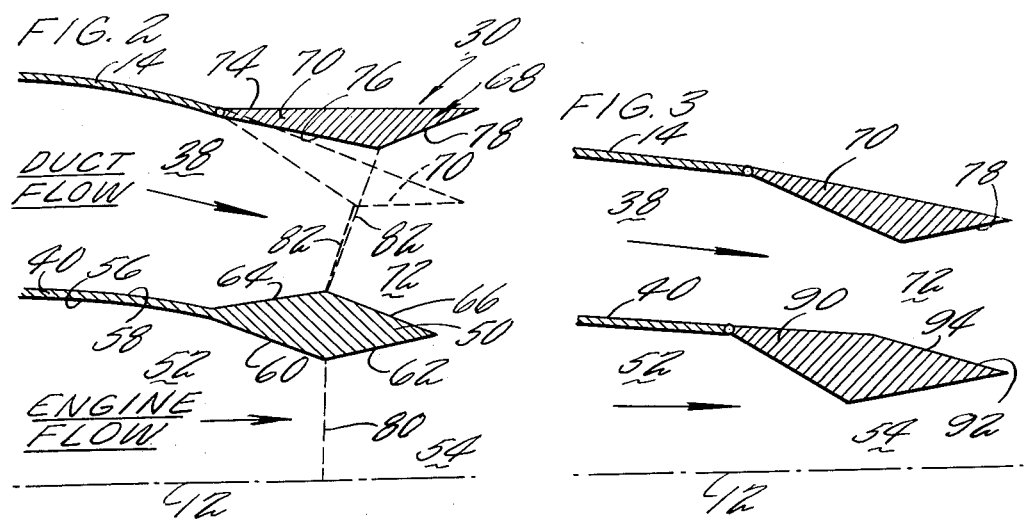
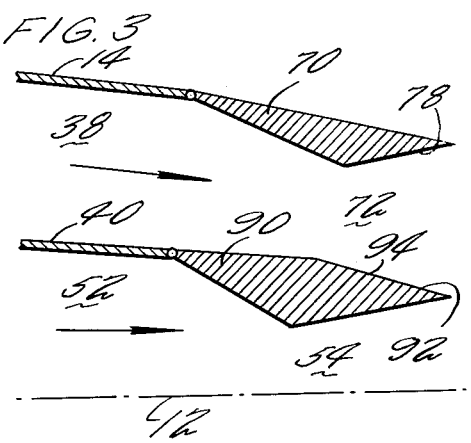
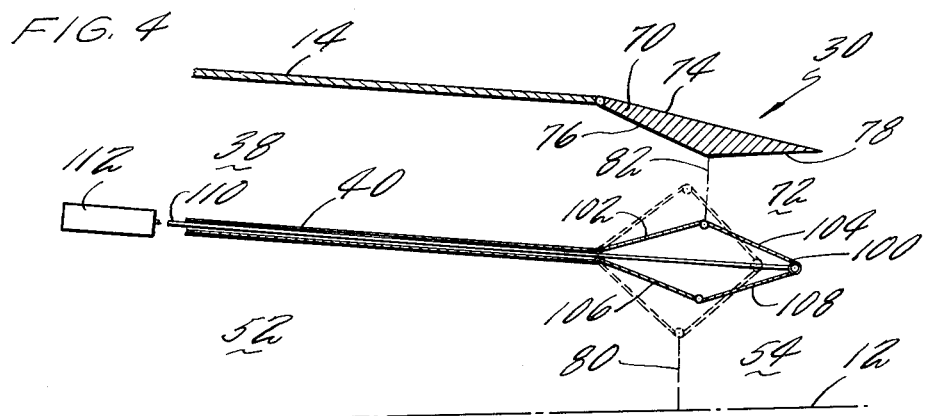
INVENTOR
THOMAS F. TUMICKI
BY Vernon F. Hauschild
ATTORNEY United States Patent Office 3,261,164
Patented July 19, 1966

3,261,164
CONVERGENT-DIVERGENT CO-ANNULAR
PRIMARY NOZZLE
Thomas F. Tumicki, Yantic, Conn., assignor to United
Aircraft Corporation, East Hartford, Conn., a corporation of Delaware
Filed Sept. 23, 1964, Ser. No. 398,622
5 Claims. (Cl. 60—35.6)

This invention relates to exhaust nozzles for powerplants of the type which generate thrust by discharging highly-energized gas to atmosphere and more particularly to such exhaust nozzles adapted for use on vehicles which operate at supersonic speeds.

When a thrust generating vehicle operates at supersonic speed, the pressure ratio of the exhaust nozzle, that is the ratio of the total pressure at the nozzle throat divided by the ambient pressure, is above 2 and, accordingly, the exhaust gases which are discharged to atmosphere through the exhaust nozzle expand after passing through the nozzle throat. It is accordingly an object of this invention to provide the greatest possible total expansion surface for this exhaust gas to expand against so that it will generate the greatest possible thrust.

It is an object of this invention to teach an exhaust nozzle which has both a central and an external exhaust outlet, both of which are convergent-divergent in shape.

It is a further object of this invention to teach a co-annular nozzle including a central duct of circular cross-section defining a convergent-divergent exhaust outlet, and a secondary duct concentrically enveloping the central duct and coperating therewith to define a convergent-divergent exhaust outlet coplanar with the central exhaust outlet.

It is a further object of this invention to teach a co-annular exhaust nozzle as described above in which at least one of the exhaust outlets is defined, at least in part, by a variable area exhaust nozzle.

Other objects and advantages will be apparent from the specification and claims and from the accompanying drawings which illustrate an embodiment of the invention.

FIG. 1 is an external side view of a thrust generating powerplant using my exhaust nozzle and which is partially broken away to illustrate engine construction.

FIG. 2 is a cross-sectional showing through a preferred embodiment of my exhaust nozzle.

FIG. 3 is a modification of my exhaust nozzle in which both the primary and secondary convergent-divergent outlets are variable area.

FIG. 4 is still a further modification of my exhaust outlet in which the primary and secondary outlets are variable area but utilizes a different mechanism than is illustrated in FIG. 3.

Referring to FIG. 1 we see powerplant 10, which is adapted to operate in a supersonic vehicle. Powerplant 10 is preferably of circular cross-section and concentric about axis 12 and enveloped within outer case or duct 14. Powerplant 10 comprises fan section 16, compressor section 18, burner section 20 and turbine section 22 and may include afterburner section 24 as well as my exhaust nozzle 30. Engine or powerplant 10 is of the by-passing or fan type in which air which enters engine inlet 32 is partially compressed by vanes 34 and blades 36 of fan section 16 and is then passed through one of two routes through the remainder of engine 10. The first such route includes flow through annular secondary passage 38 which is defined between outer case or duct 14 and inner case or duct 40. After passing the full length of engine 10 through passage 38, the gases are discharged to atmosphere through my exhaust nozzle 30. While under some circumstances it may be desirable to pass compressed air or gas directly from fan section 16 through passage 38 and exhaust nozzle 30 to atmosphere, under other circumstances it may be desirable to add additional energy to the air or gas passing through passage 38 by duct heating, that is, injecting atomized fuel into passage 38 through spray bars 42 for mixing with air therein and burning in the combustion zone 4 established downstream of flameholder 46. Flameholder 46 may be of the conventional V-ring type or of the aerodynamic type shown in U.S. Patent No. 2,938,344.

The second route which the compressed air from fan section 16 may follow in passing through remainder of engine 10 is through compressor section 18, where it is further compressed, then through burner section 20 where heat is added to the compressed air, then through turbine section 22, where sufficient energy is extracted from the exhaust gas to drive compressor 18, then into afterburner 24 for reheating, then atmosphere through my exhaust nozzle 30.

Engine 10 may be of the type more fully described in U.S. Patent Nos. 3,102,385; 3,118,276; 3,108,767 or 3,002,352. Compressor 18, burner 20 and turbine 22 may be of the type more fully described in U.S. Patent Nos. 2,711,631 and 2,747,367. Afterburner 24 may be of the type more fully described in U.S. Patent Nos. 2,846,841, and 2,846,842.

A preferred embodiment of my exhaust nozzle 30 is shown in FIG. 2. Exhaust nozzle 30 comprises the after-end of central case or duct 40, which culminates in exhaust outlet defining mechanism or fixed nozzle 50 such that central flow passage 52 and outlet 54 of central flow passage 52 are defined therewithin. It will be noted that duct 40 and its outlet defining apparatus 50 include inner surface 56 and outer surface 58. Inner surface 56 culminates in section 60, which converges toward axis 12 and then section 62, which diverges away from axis 12 so that central outlet 54 is convergent-divergent in shape.

It will be noted that the other surface 58 of duct 40 and its outlet defining member 50 culminates in portion 64, which diverges away from axis 12 and then portion 66 which converges toward axis 12.

Nozzle 30 further includes the after portion of outer case or duct 14 and variable area exhaust nozzle 68, which is attached to the downstream end thereof. Nozzle 68 includes a plurality of circumferentially positioned and overlapping exhaust flaps 70, which may be actuated in conventional fashion or aerodynamically to its outer or solid line FIG. 2 position and to its inner, phantom FIG. 2 position. Nozzle 68 cooperates with outlet member 50 of duct 40 at all times to define variable area and convergent-divergent outlet 72 therebetween. Outlet 72 is the outlet of exhaust gas passage 38 which is defined between ducts 14 and 40. It will be noted that flaps 70 include outer surface 74, which forms a substantially cylindrical continuation of outer duct 14 when in its FIG. 2 solid line or outer position and also includes forward inner surface 76, which converges toward axis 12 in all positions of flaps 70 and after inner surface 78, which diverges away from axis 12 in all positions of flaps 70. Ducts 14 and 40 and fixed nozzle 50 and variable area nozzle 68 are preferably of circular cross-section, and concentrically positioned about axis 12 so that central passage 52 and its outlet 54 are of circular cross-section while passage 38 and its outlet 72 are also of circular cross-section. Outlets 72 and 54 are coplanar.

This construction is particularly advantageous at high supersonic speeds when exhaust nozzle 30 is operating at a high pressure ratio. Under this condition the exhaust gas which passes through throat 80 of fixed nozzle 50 and through throat 82 of the variable area nozzle, defined between 50 and 68, commences to expand. This expanding exhaust gas is capable of thrust generation if it has surfaces to expand against. My exhaust nozzle provides such surfaces in maximum area form. It will be noted that the exhaust gases being discharged to atmosphere form central passage 52, after passing through central throat 80, may expand against annular surface 62 of nozzle member 50. The exhaust gases from outer duct 38, after passing through throat 82, may expand against annular surface 66 of fixed nozzle 50 and also against annular surface 78 of flaps 70. It will accordingly be seen that the exhaust gas being discharged through exhaust nozzle 30 can expand against annular surface 62, 66 and 78, thereby providing maximum thrust creating surface and hence maximum thrust generation.

FIG. 3 is a modification of exhaust nozzle 30 in which both the primary outlet 54 and the secondary outlet 72 are variable area as well as convergent-divergent and coplanar. This is accomplished by again providing flaps 70 at the downstream end of duct 14 and providing similar flap 90 at the downstream end of duct 40. Flaps 70 and 90 may be actuated in conventional fashion or aerodynamically such that in all positions the exhaust gas which discharges through outlet 54 of passage 52 may expand against divergent surface 92, while the exhaust gases which discharge through annular outlet 72 of passage 38 may discharge against divergent annular surface 78 and convergent annular surface 94.

FIG. 4 is a further modification of my coannular, coplanar exhaust nozzle 30. Flaps 70 are used at the downstream end of duct 14 as in FIGURES 2 and 3, while actuatable flap system 100 is attached to the after end of duct 40. Flap mechanism 100 consists of pivotal flap sections 102, 104, 106 and 108, which may be actuated between their solid line FIG. 4 positions and their phantom FIG. 4 positions by mechanism such as actuator rod 110 and power piston 112. Flap sections 102 and 106 are pivotally connected to duct 40 and flap sections 104 and 108, respectively, while flap sections are pivotally connected to each other and flap sections 102 and 106, respectively. It will be noted that with this construction exhaust outlets 54 and 70 are convergent-divergent for all flap positions, as in FIGURES 2 and 3. Accordingly, the exhaust gas which discharges through passage 52 flows along convergent surface 106 then through outlet throat 80 and then along divergent surface 108. In like fashion, the gases passing through passage 38 first flow between annular convergent surface 76 and divergent surface 102, then through exhaust outlet throat 82, then between divergent surfaces 78 and 104, the former of which is diverged with respect to axis 12 and the latter of which is converged with respect to axis 12.

While my exhaust nozzle 30 has been illustrated and described herein as being of circular cross section, it could also be two-dimensional as in U.S. Patent No. 3,057,150.

It is to be understood that the invention is not limited to the specific embodiment herein illustrated and described but may be used in other ways without departure from its spirit as defined by the following claims.

I claim:

1. A bypass fan engine of circular cross section and concentric about an axis and having a forward and an after end and which generates thrust by discharging exhaust gases to atmosphere through an exhaust nozzle and including an outer duct of circular cross section and extending the full length of the engine and having an inner surface culminating in an outlet at said engine after end, which inner surface first converges towards said axis then diverges away from said axis adjacent said outer duct outlet, an engine fan section positioned at the forward end of said outer duct, a central duct of circular cross section extending from said fan section to said engine after end and having an inner and outer surface and culminating in an outlet co-planar with said outer duct outlet, said central duct being concentrically enveloped within said outer duct and cooperating with said outer duct to form an annular gas passage therebetween and defining a second gas passage therewithin and separated thereby from said annular gas passage, said inner surface of said central duct converging towards said axis then diverging away from said axis adjacent said inner duct outlet to define a convergent-divergent exhaust nozzle of circular cross section therewithin, said outer surface of said central duct diverging away from said axis then converging towards said axis adjacent said outer duct outlet and positioned to cooperate with said converging surface and said diverging surface of said inner duct to define a convergent-divergent, annular exhaust nozzle therebetween, means to support combustion within said annular gas passage, and positioned to cooperate with said fan section to produce high energy gas for discharge through said annular exhaust nozzle, and compressor means, combustion chamber means and turbine means within said inner duct to discharge high energy exhaust gases through said circular exhaust nozzle.

2. Apparatus according to claim 1 wherein at least one of said exhaust nozzles is variable area.

3. Apparatus according to claim 1 wherein both of said exhaust nozzles are variable area.

4. A coannular, coplanar exhaust nozzle of circular cross section and concentric about an axis and including a central duct of circular cross section and concentric about said axis and having an inner and outer surface and an outlet, said inner surface of said central duct converging toward said axis then diverging away from said axis adjacent said outlet to define a convergent-divergent exhaust nozzle of circular cross section, said outer surface of said central duct diverging away from said axis then converging toward said axis adjacent said outlet, an outer duct of circular cross section and concentric about said axis and positioned exterior of said inner duct and cooperating therewith to form an annular passage therebetween and having an inner surface and an outlet coplanar with said central duct outlet, said outer duct inner surface first converging toward said axis then diverging from said axis adjacent said outer duct outlet and cooperating with said central duct outer surface to define an annular convergent-divergent exhaust nozzle.

5. Apparatus according to claim 4 wherein said exhaust nozzle of circular cross section comprises a first plurality of circumferentially positioned flaps pivotally connected at a first end to said central duct, a second plurality of circumferentially positioned flaps positioned rearwardly of said first flaps and pivotally connected at one end to the other end of said first flaps, a third plurality of circumferentially positioned flaps pivotally connected at their first end to said central duct, a fourth plurality of circumferentially positioned flaps pivotally connected at their first end to the other end of said third flaps and pivotally connected at their other end to the other end of said second flaps, means connected to said flaps to cause said flaps to pivot with respect to said central duct and to each other to simultaneously vary the area of said circular convergent-divergent exhaust nozzle and said annular convergent-divergent exhaust nozzle.

References Cited by the Examiner

UNITED STATES PATENTS

| 2,636,343 | 4/1953 | Painter | 60—35.6 |
| 2,850,873 | 9/1958 | Hausmann | 60—35.6 |
| 3,102,385 | 9/1963 | Lyons | 60—35.6 |

FOREIGN PATENTS 906,384  9/1962  Great Britain.

MARK NEWMAN, *Primary Examiner.*

RALPH D. BLAKESLEE, *Examiner.*